(12) United States Patent
Burkhardt et al.

(10) Patent No.: US 9,744,822 B2
(45) Date of Patent: Aug. 29, 2017

(54) TRAILER COUPLING

(71) Applicant: Scambia Holdings Cyprus Limited, Limassol (CY)

(72) Inventors: Volker Burkhardt, Moeglingen (DE); Bernd Noatsch, Sindelfingen (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/731,975

(22) Filed: Jun. 5, 2015

(65) Prior Publication Data
US 2015/0352915 A1   Dec. 10, 2015

(30) Foreign Application Priority Data
Jun. 6, 2014 (DE) .................. 10 2014 108 071

(51) Int. Cl.
| | |
|---|---|
| *B60D 1/54* | (2006.01) |
| *H01R 33/945* | (2006.01) |
| *B60D 1/56* | (2006.01) |
| *B60D 1/06* | (2006.01) |
| *B60D 1/64* | (2006.01) |
| *B60D 1/48* | (2006.01) |

(52) U.S. Cl.
CPC .............. *B60D 1/54* (2013.01); *B60D 1/06* (2013.01); *B60D 1/065* (2013.01); *B60D 1/485* (2013.01); *B60D 1/56* (2013.01); *B60D 1/64* (2013.01); *H01R 33/945* (2013.01); *B60D 2001/544* (2013.01)

(58) Field of Classification Search
CPC ... B60D 1/06; B60D 1/62; B60D 1/54; B60D 2001/542
See application file for complete search history.

(56) References Cited

U.S. PATENT DOCUMENTS

| 7,699,335 B2* | 4/2010 | Riehle ............... B60D 1/54 |
| | | 280/478.1 |
| 8,967,653 B2* | 3/2015 | Gentner ............ B60D 1/06 |
| | | 280/491.3 |
| 2003/0075900 A1* | 4/2003 | Kleb ............... B60D 1/246 |
| | | 280/491.3 |

FOREIGN PATENT DOCUMENTS

| DE | 29800542 U1 | 3/1998 |
| DE | 29807409 U1 | 8/1998 |

(Continued)

*Primary Examiner* — Kevin Hurley
(74) *Attorney, Agent, or Firm* — Reinhart Boerner Van Deuren P.C.

(57) ABSTRACT

In order to solve the problem, in the case of a trailer coupling comprising a ball neck supporting a coupling ball, and also comprising a socket receptacle for a socket for the power supply of units acting on the coupling ball, the socket having a socket housing with a housing sleeve, which is provided with an insertion opening, and the insertion opening being closable by a cover that is mounted pivotably on the housing sleeve, of being able to mount the sockets as conveniently and easily as possible, it is proposed that the socket receptacle has a receiving channel, into which the housing sleeve extends starting from a first side of the socket receptacle, that the housing sleeve bears against the first side of the socket receptacle via a bearing surface, and that the housing sleeve is fixed to the socket receptacle by a retaining element, which is fitted starting from a second side of the socket receptacle and which is supported on the socket receptacle and is connected to the housing sleeve by a latched connection.

22 Claims, 18 Drawing Sheets

(56) References Cited

FOREIGN PATENT DOCUMENTS

| DE | 19715469 A1 | 10/1998 | |
|---|---|---|---|
| DE | EP 0872364 A1 * | 10/1998 | ............... B01D 1/06 |
| DE | 29825216 U1 | 4/2006 | |
| DE | 202009005591 U1 | 7/2009 | |
| DE | 202010004439 U1 | 8/2011 | |
| DE | 102010049614 A1 | 4/2012 | |
| EP | 1006624 A2 | 6/2000 | |
| EP | 2037545 A2 | 3/2009 | |

* cited by examiner

TRAILER COUPLING

CROSS-REFERENCE TO RELATED PATENT APPLICATION

This patent application claims the benefit of German application No. 10 2014 108 071.8, filed Jun. 6, 2014, the teachings and disclosure of which are hereby incorporated in their entirety by reference thereto.

BACKGROUND OF THE INVENTION

The invention relates to a trailer coupling comprising a ball neck supporting a coupling ball, and also comprising a socket receptacle for a socket for the power supply of units acting on the coupling ball, the socket having a socket housing with a housing sleeve, which is provided with an insertion opening, and the insertion opening being closable by a cover that is mounted pivotably on the housing sleeve.

Trailer couplings of this type are known from the prior art.

Here, units that act on the coupling ball are to be understood to be either towing ball couplings of trailers, which act on the coupling ball such that a hinged connection to the trailer is produced via the coupling ball, or load carriers, for example bicycle racks, which act on the coupling ball and are mounted thereon, the entire load carrier being supported exclusively by the coupling ball and the ball neck.

In trailer couplings of this type there is the problem of being able to mount the socket as conveniently and easily as possible.

SUMMARY OF THE INVENTION

This problem is solved in accordance with the invention in a trailer coupling of the type described in the introduction in that the socket receptacle has a receiving channel, into which the housing sleeve extends starting from a first side of the socket receptacle, in that the housing sleeve bears against the first side of the socket receptacle via a bearing surface, and in that the housing sleeve is fixed to the socket receptacle by a retaining element, which is fitted starting from a second side of the socket receptacle and which is supported on the socket receptacle and is connected to the housing sleeve by a latched connection.

The advantage of the solution according to the invention is considered to be constituted by the fact that a simple possibility is thus created for fixing the housing sleeve to the socket receptacle without connecting the socket housing to the socket receptacle by screws, which was the case previously.

In addition, the solution according to the invention with the provision of a latched connection also has the advantage that the latched connection can be configured such that it can adapt to different embodiments of the socket receptacle with usual tolerances.

In view of the fixing of the retaining element on the socket receptacle, a wide range of possibilities are conceivable.

In accordance with an advantageous solution the retaining element is supported in the receiving channel.

Here, the receiving channel may have recesses, for example, in which the retaining element is supported.

However, in accordance with an advantageous solution, the retaining element is supported on a conically widening wall region of the receiving channel.

In particular, the conically widening wall region is configured here such that it widens in the direction of the second side of the socket receptacle, such that a retaining element inserted into the receiving channel from the second side can be supported on the conical wall region narrowing in the direction of the first side.

Alternatively or additionally, the retaining element is supported via a supporting flange on a side of the socket receptacle opposite the first side.

In addition, it is advantageous when the socket is fixed in the socket receptacle in a manner fixed against rotation.

By way of example, this would be possible by fixing the housing sleeve in the housing receptacle in a manner fixed against rotation, for example by means of positively-locking elements.

However, in accordance with a particularly advantageous solution, the retaining element is secured on the socket receptacle in a manner fixed against rotation by positively-locking elements.

A securing of the retaining element in a manner fixed against rotation has the advantage that on the one hand there is the possibility of securing the retaining element, in the region of which a cable guide usually extends, in an unambiguous manner, fixed against rotation, and on the other hand there is the possibility to vary the orientation of the housing sleeve relative to the retaining element.

In particular, the retaining element has a positively-locking element, which enters into a rotationally fixed positively-locking connection with a positively-locking element of the socket receptacle.

These positively-locking elements could be formed for example as toothings and counter-toothings, or as any non-rotationally symmetrical structures, which are formed in a manner corresponding to one another.

In accordance with a particularly favourable solution, the socket receptacle, as positively-locking element, has a pocket extending from the second side of the socket receptacle into the receiving channel.

In this case the retaining element expediently has a body engaging with the pocket, such that the positively-locking elements are formed by the body and the pocket.

In particular, the positively-locking elements expediently extend parallel to a fitting direction of the retaining element, such that the positively-locking elements engage with one another by fitting the retaining element.

With regard to an orientation of the retaining element and the housing sleeve relative to one another, no further details have been provided in conjunction with the previously explained exemplary embodiments.

In accordance with an advantageous solution, the retaining element and the housing sleeve are connectable to one another in a manner fixed against rotation relative to one another in at least one rotary position, preferably in various rotary positions.

This means that it is possible to fix the housing sleeve in at least one rotary orientation, preferably in different rotary orientations, relative to the retaining element.

By way of example, in order to fix the retaining element and the housing sleeve relative to one another in at least one rotary position, the retaining element and the housing sleeve are connected in a manner fixed against rotation by positively-locking elements.

Positively-locking elements of this type could be, for example, radial toothings, which mesh with one another.

In the case of radial toothings of this type, it is also possible to select a different orientation of the housing sleeve relative to the retaining element in the case of the connection between housing sleeve and retaining element.

A solution that is particularly expedient is one in which at least one of the positively-locking elements is arranged on the housing sleeve and/or the retaining element in a number of angular positions about the centre axis, the other positively-locking element engaging with the first-mentioned positively-locking element such that it is possible, already by means of the number of angular positions of the first-mentioned positively-locking element, to bring the other positively-locking element into engagement with one of the positively-locking elements in one of these angular positions.

By way of example, the positively-locking elements for fixing the housing sleeve and the retaining element to one another in a rotationally fixed manner also extend parallel to the fitting direction.

With regard to the establishment of the latched connection between the retaining element and the housing sleeve, a wide range of solutions are conceivable.

In accordance with an advantageous solution the latched connection is effective in a position-independent manner within a latching region extending in the fitting direction.

This means that the latched connection has a latching region extending in the fitting direction, and that the latched connection is effective within this latching region, irrespective of the position within the latching region at which the latched connection occurs.

With a latched connection of this type it is thus possible to mount the socket in the socket receptacle in a tolerance-insensitive manner, i.e. the socket receptacle can be produced with considerable tolerances, in particular considerable tolerances with regard to the distance of the first side from the second side and/or the design of the receiving channel, and the socket nevertheless always can be mounted in a reliable, simple and secure manner in that the latched connection is effective in a position-independent manner within the latching region, such that for example a varying spacing of the first side from the second side and/or a varying diameter of the receiving channel can be compensated for by a different positioning of the retaining element relative to the housing sleeve and thus by sliding on the retaining element to a different extent in the fitting direction.

A position-independent latching region of this type can be provided preferably in that the retaining element is latchable to the housing sleeve in that either the housing sleeve or the retaining element has a latching toothing with a series of latching teeth extending parallel to the fitting direction and the retaining element or the housing sleeve has a counter-toothing with at least one latching tooth meshing with the series of latching teeth.

Due to the extension of the series of latching teeth of the latching toothing in the fitting direction, it is possible to define the extension of the latching region within which the latched connection is effective in a position-independent manner.

However, the solution according to the invention can also be developed advantageously by further features effective within the scope of a trailer coupling.

In accordance with a particularly expedient solution, the retaining element is formed as part of a housing cover for closing the housing sleeve on a side opposite the insertion, in particular a rear-side opening of the housing sleeve.

The fixing of the housing sleeve in the socket receptacle can thus be combined in a simple manner with the mounting of a cover for closing the housing sleeve.

In addition, with a trailer coupling according to the invention, a sensor is provided in the ball neck or in the coupling ball, such that a sensor connection line also has to run in the region of the receiving channel.

In accordance with an advantageous solution, the receiving channel has an indentation for receiving a sensor connection line.

In addition, in accordance with a further advantageous solution, the sensor connection line alternatively or additionally is guided along an outer surface of the retaining element, such that for example it is possible to guide the sensor connection line between the outer surface of the retaining element and the receiving channel, in particular the indentation in the receiving channel.

Alternatively, it is advantageously possible to form the retaining element such that it has a guide for the sensor connection line, in particular a channel as guide for the sensor connection line, such that the sensor connection line can run in the guide or the channel of the retaining element.

Here, the guide or the channel of the retaining element preferably lies outside the outer surface of the retaining element, such that, for example, the guide or the channel may also be arranged such that they are arranged in the indentation of the receiving channel.

Alternatively to the guide of the sensor connection line in the region of the receiving channel or in the region around the retaining element, in particular between the retaining element and the receiving channel, the sensor connection line is guided in the housing cover of the socket in accordance with a further advantageous solution.

In this case the housing cover provides an expedient possibility for providing a plug connection for the plug connection line.

This plug connection could be formed here such that it lies loosely in the housing cover.

However, in accordance with a particularly advantageous solution, the plug connection is fixed to the housing cover, in particular is fixed detachably.

In accordance with another advantageous solution, a plug connector element of a plug connector for the sensor connection line is integrated in the housing cover.

With this solution it is thus no longer possible to fix the plug connector within the housing, but instead the fixing is already provided in that a plug connector element of the plug connector is integrated in the housing cover.

In accordance with a further advantageous solution a receiving space for an electrical or electronic circuit is provided in the housing cover.

An electronic circuit of this type can be used in many ways.

By way of example, this electronic circuit could be an electronic circuit associated with a sensor or an electronic circuit comprising or cooperating with control elements for the trailer coupling or monitoring elements for the trailer coupling.

Here, the electronic circuit may also comprise additional switching elements operable for example from the housing cover, or also display elements arranged on the housing cover, in particular integrated in the housing cover.

In accordance with a particularly favourable solution, the housing cover has a receiving space for an electronic circuit connected to the sensor connection line, such that this electronic circuit may be, for example, an evaluation circuit or control circuit for a sensor system connected to the sensor connection line.

With regard to a sensor system connected to the sensor connection line, no further details have been provided previously.

In accordance with an advantageous solution, the sensor connection line is guided to a sensor system associated with a ball neck.

A sensor system of this type for example may be an angle of inclination sensor, which is integrated in the coupling ball or the ball neck, in particular a region of the ball neck adjoining the coupling ball.

However, a sensor system of this type may also be a load sensor, which is integrated in the coupling ball or in the ball neck.

A load sensor of this type can be formed for example as a supporting load sensor, which detects merely the supporting load that acts on the coupling ball and/or the ball neck.

However, a sensor of this type may also be configured as a sensor detecting the load of the coupling ball and/or the ball neck as a whole, which not only detects the supporting load, but also all other forces acting on the coupling ball and/or the ball neck.

Further features and advantages of the invention will be disclosed in the following description and will be presented in the drawings showing illustrations of some exemplary embodiments.

BRIEF DESCRIPTION OF THE DRAWINGS

FIG. 11 shows an enlarged illustration of a latching toothing between the retaining element and the housing sleeve;

DETAILED DESCRIPTION OF THE INVENTION

Figure 1:
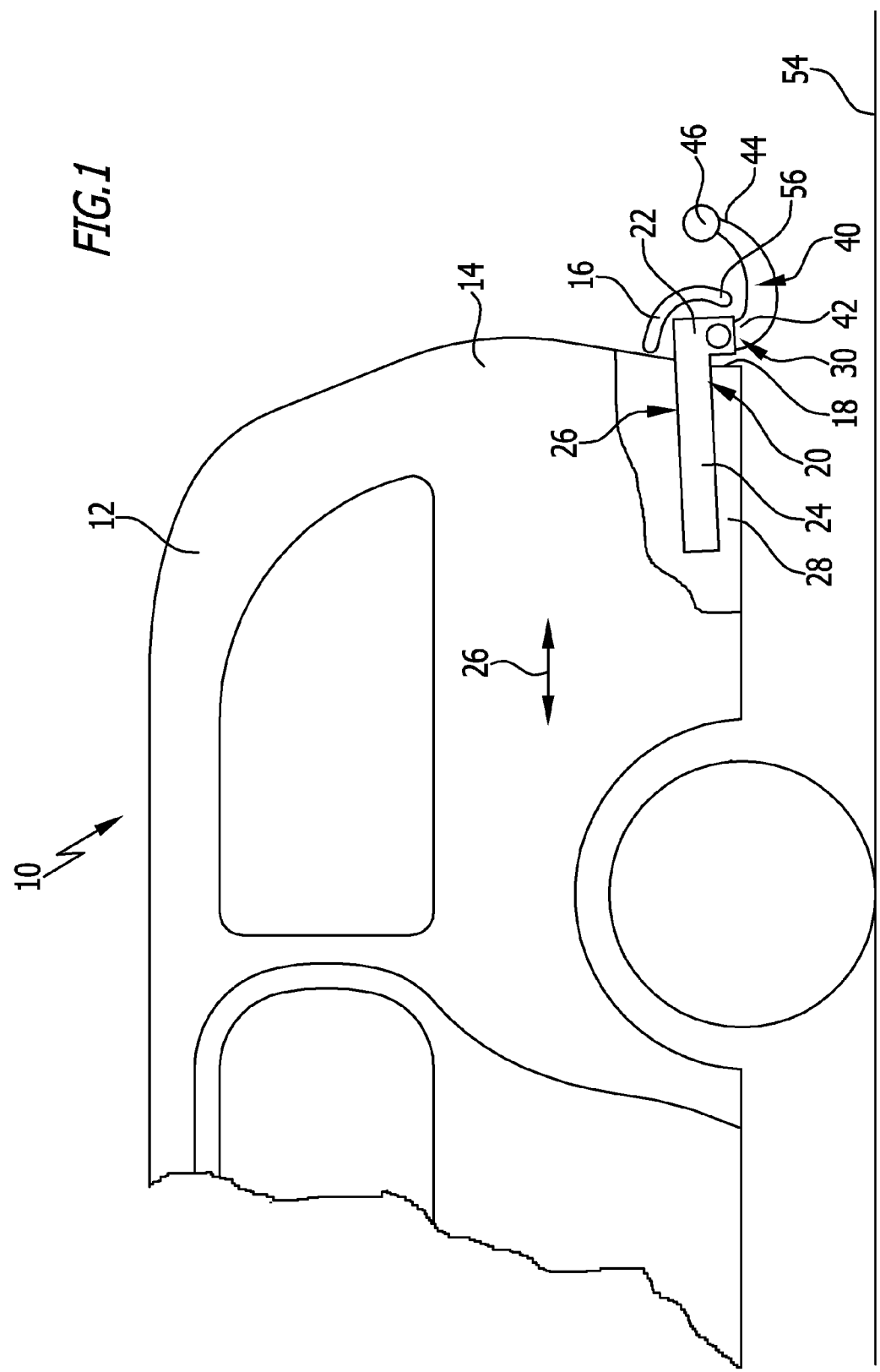
FIG. 1 shows a schematic side view of a motor vehicle having a trailer coupling.

A motor vehicle illustrated in FIG. 1 and designated as a whole by 10 comprises a motor vehicle body 12, which carries a bumper unit 16 on a rear end 14. A crossmember 22 of a coupling carrier unit 20 is provided on the rear side 18 of the rear end 14 covered by the bumper unit 16 and on the bumper unit 16 and is fixed by side supports 24 to the rear end 14 of the motor vehicle body 12 in that the side supports 24 extend parallel to a longitudinal direction 26 of the motor vehicle body 12 and are fixed to the rear end 14 in side regions 28 thereof.

The coupling carrier unit 20 is also provided with a bearing unit designated as a whole by 30, the bearing base 32 of said bearing unit being fixedly connected to the crossmember 22.

The bearing unit 30 also comprises a bearing element designated as a whole by 34, which is connected to a first end 42 of a ball neck designated as a whole by 40, which extends from the first end 42 to a second end 44 and at the second end 44 thereof carries a coupling ball designated as a whole by 46.

The bearing element 34 may be a bearing element fixedly connected to the bearing base 32 or a bearing element that is mountable removably on the bearing base 32.

Figure 2:
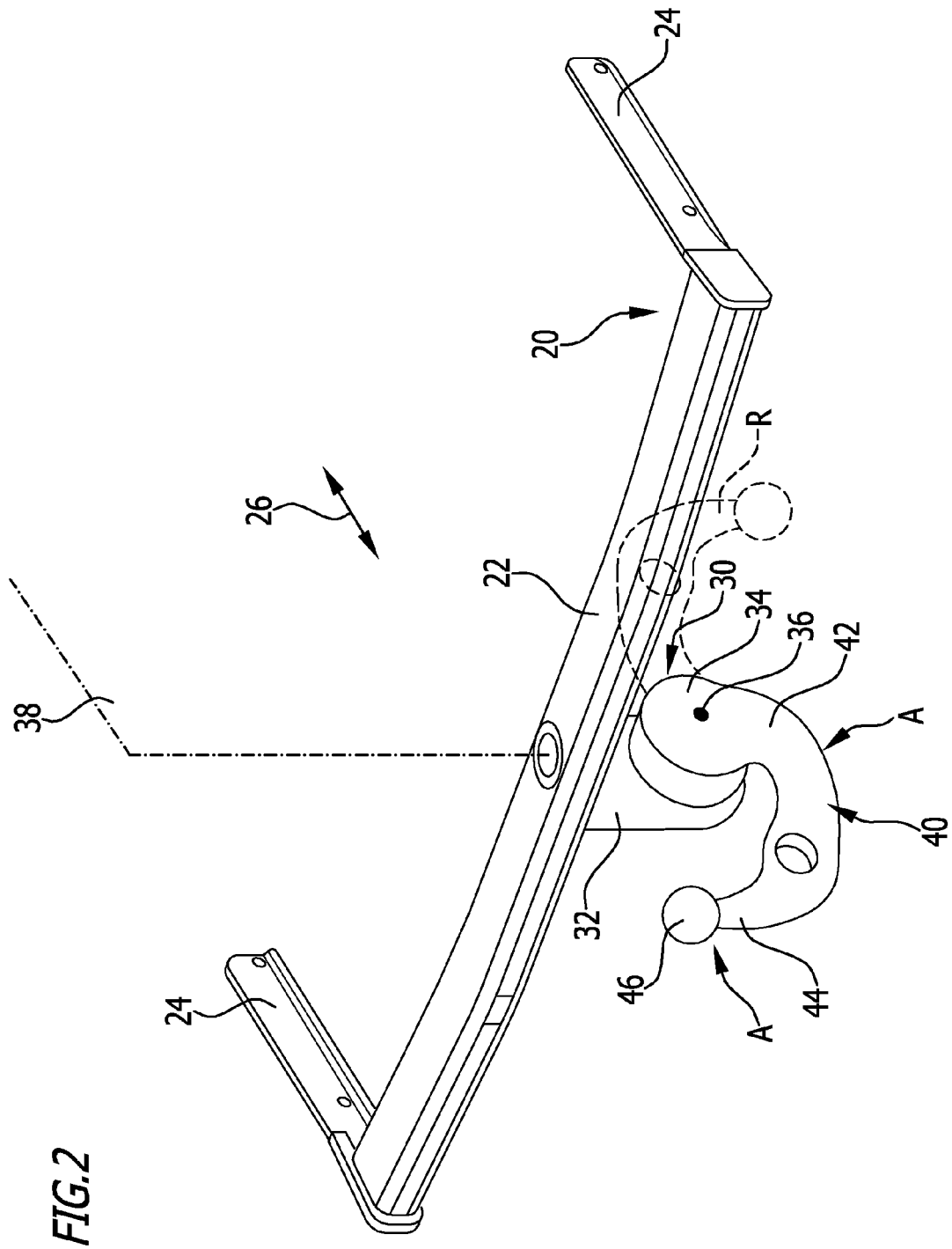
FIG. 2 shows an illustration of the trailer coupling that is mountable on the vehicle.

Alternatively however, the bearing element 34 may be a pivot bearing element, which is pivotable relative to the bearing base 32 about a pivot axis designated by 36, such that the ball neck 40 is pivotable from the working position A illustrated in FIG. 2 by solid lines into a rest position R illustrated by dashed lines, in which the ball neck 40 extends, starting from the bearing base 32, transversely to the longitudinal direction 26 of the motor vehicle body 12 and therefore along the crossmember 22.

The ball neck 40 thus runs, in the rest position R illustrated by dashed lines, transversely to a vertical longitudinal centre plane 38 of the motor vehicle body 12 and also of the coupling carrier unit 20, the vertical longitudinal centre plane 38 thus also running parallel to the longitudinal direction 26.

Further, the pivot axis 36 also runs preferably transversely to the longitudinal centre plane 38, but inclined relative to the vertical longitudinal centre plane 38 by an angle, the angle being less than 70° and more than 20°.

Figure 3:
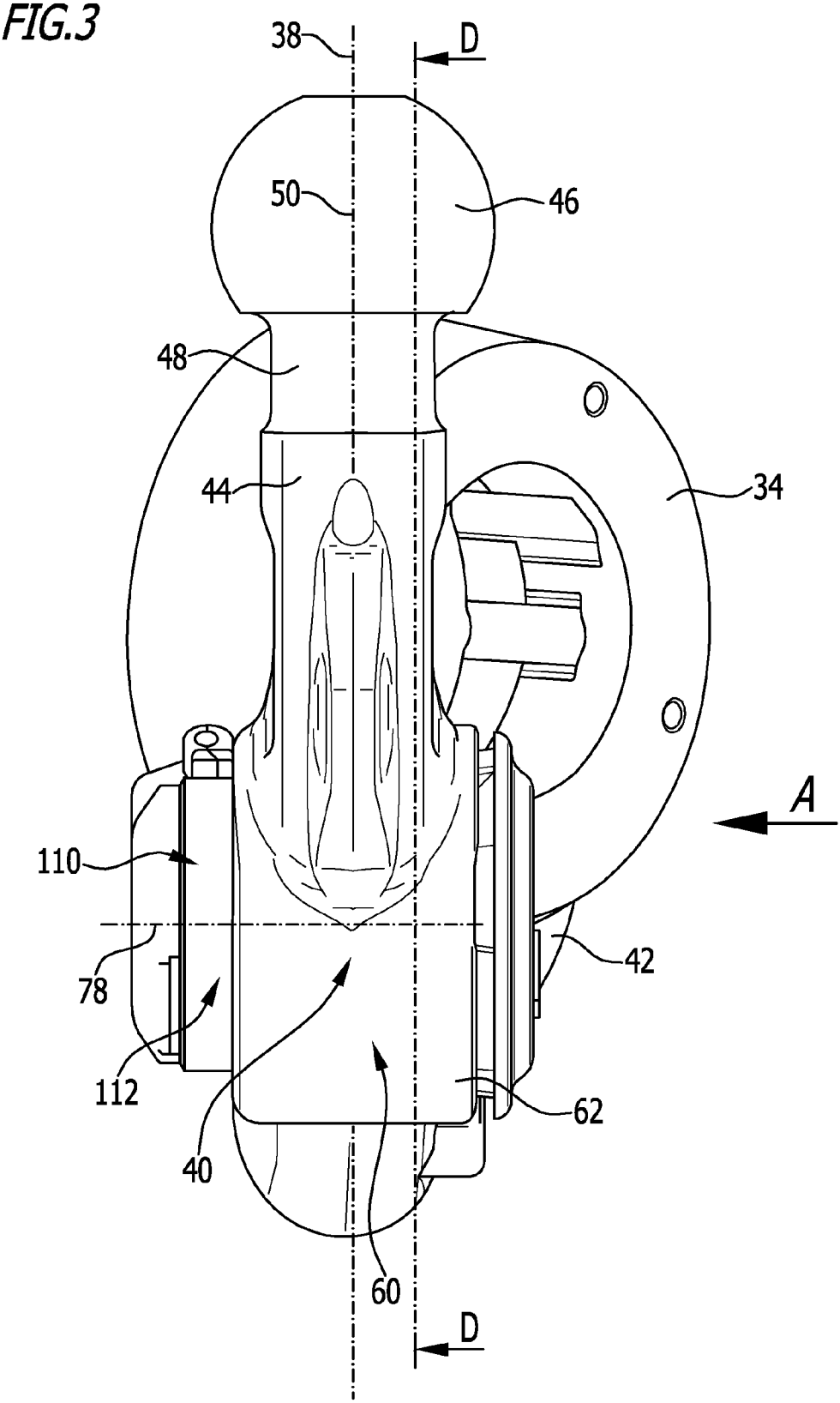
FIG. 3 shows a first exemplary embodiment of a ball neck of a trailer coupling according to the invention with coupling ball.

An exemplary embodiment of a ball neck 40 of this type is illustrated in an enlarged manner in FIG. 3, the ball neck 40 being formed integrally on the bearing element 34 and the bearing element 34 in this case is formed as a pivot bearing element for pivotable mounting on the bearing base 32.

In the illustrated exemplary embodiment of the ball neck 40, this carries, at the second end 44 thereof, a ball attachment 48, which has a circumferential surface running cylindrically relative to a ball centre axis 50 and running at a radial distance around the ball centre axis 50, which distance is smaller than a radius of the coupling ball 46.

Figure 4:
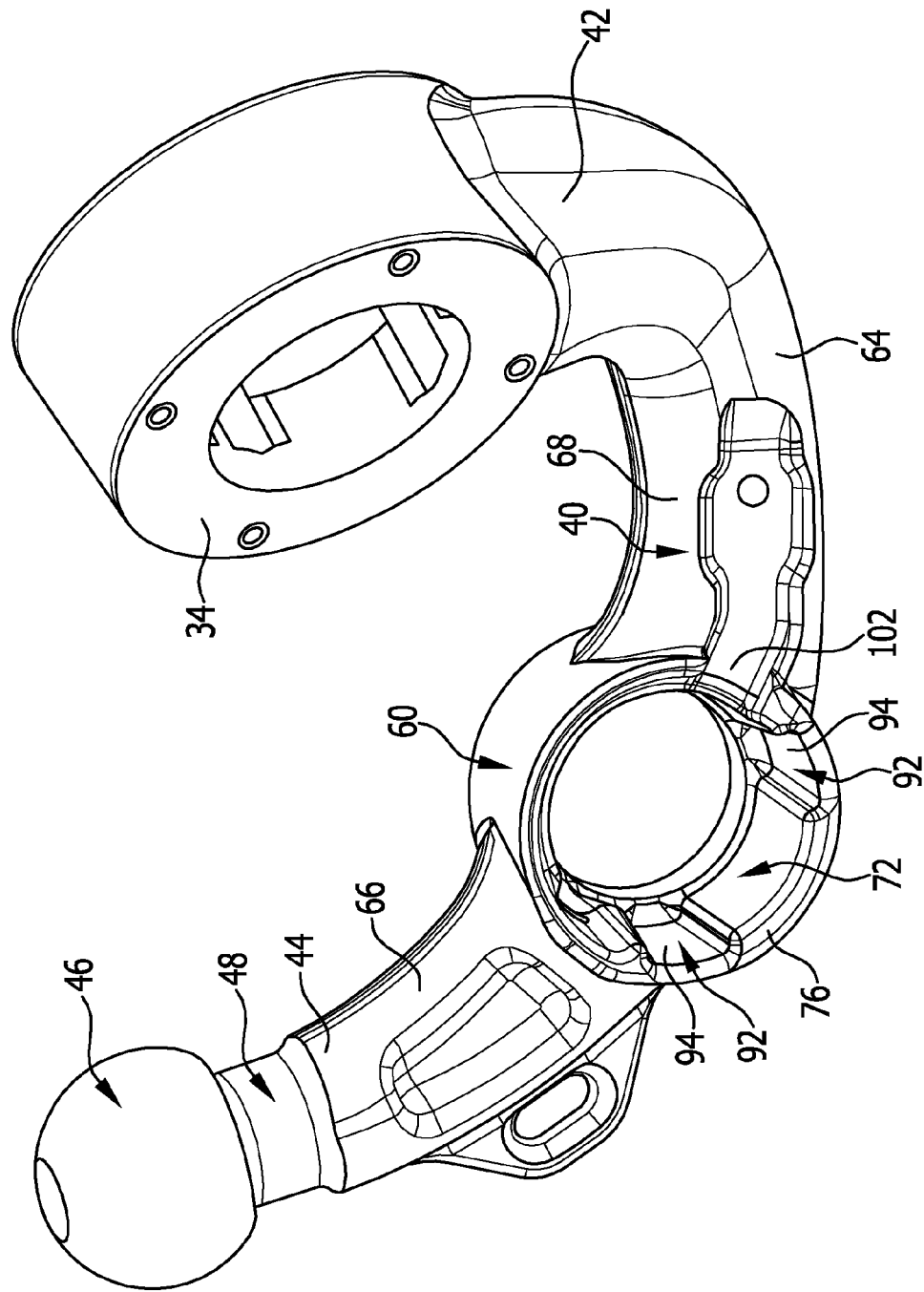
FIG. 4 shows a view of the first exemplary embodiment of the ball neck in the direction of the arrow A in FIG. 3 without socket inserted into the socket receptacle.
Figure 5:
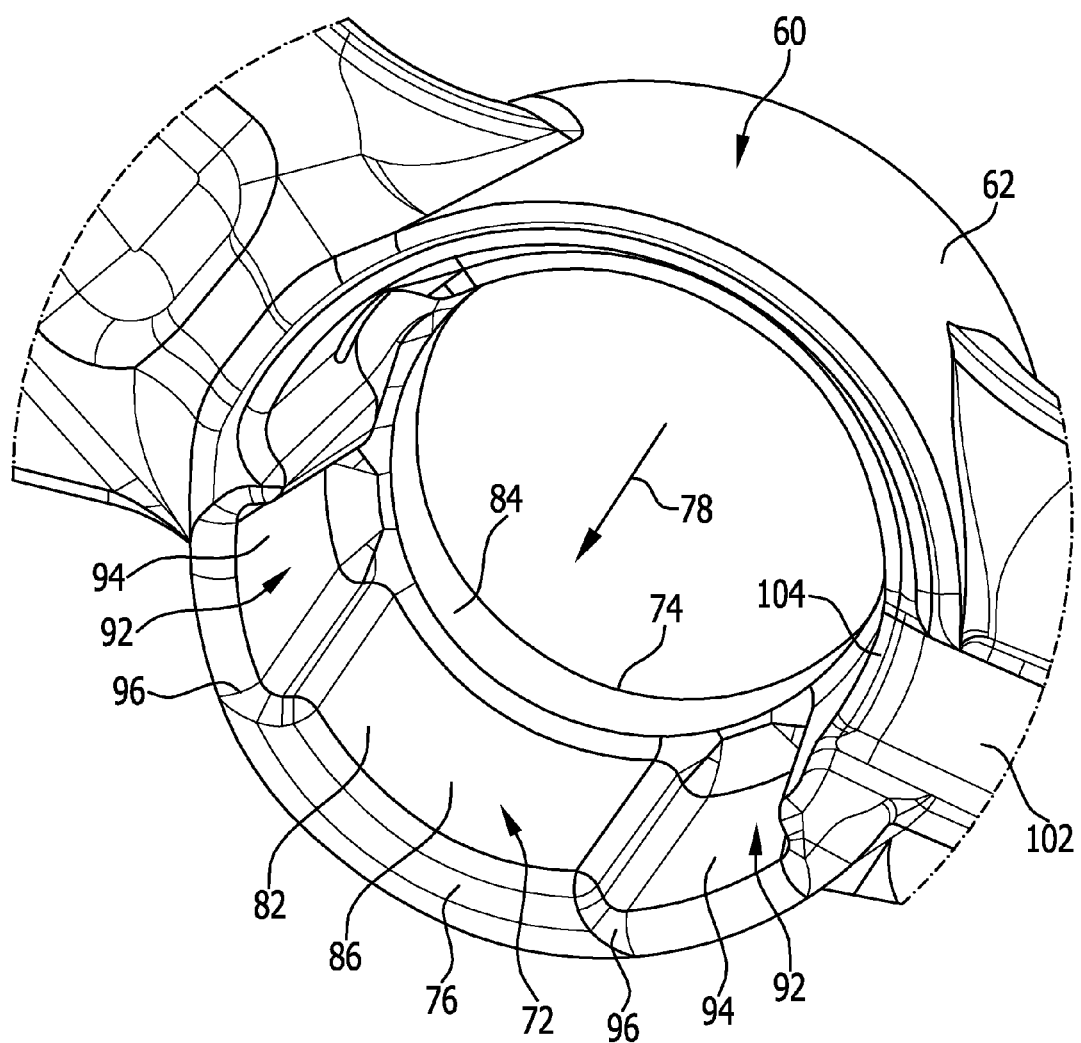
FIG. 5 shows an enlarged view of the socket receptacle without inserted socket.
Figure 6:
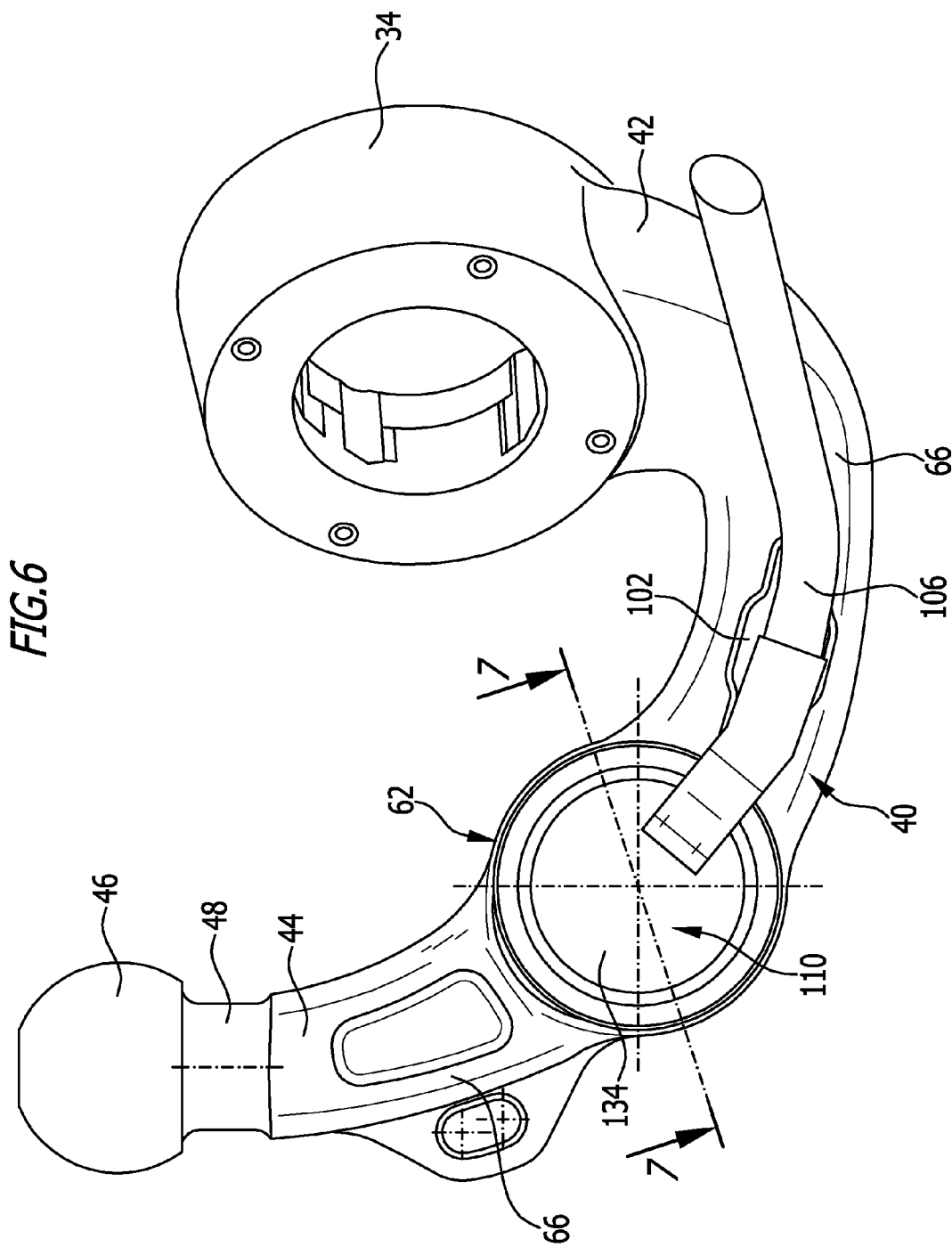
FIG. 6 shows an illustration of the ball neck of the first exemplary embodiment of the trailer coupling according to the invention similarly to FIG. 4 with inserted socket.
Figure 7:
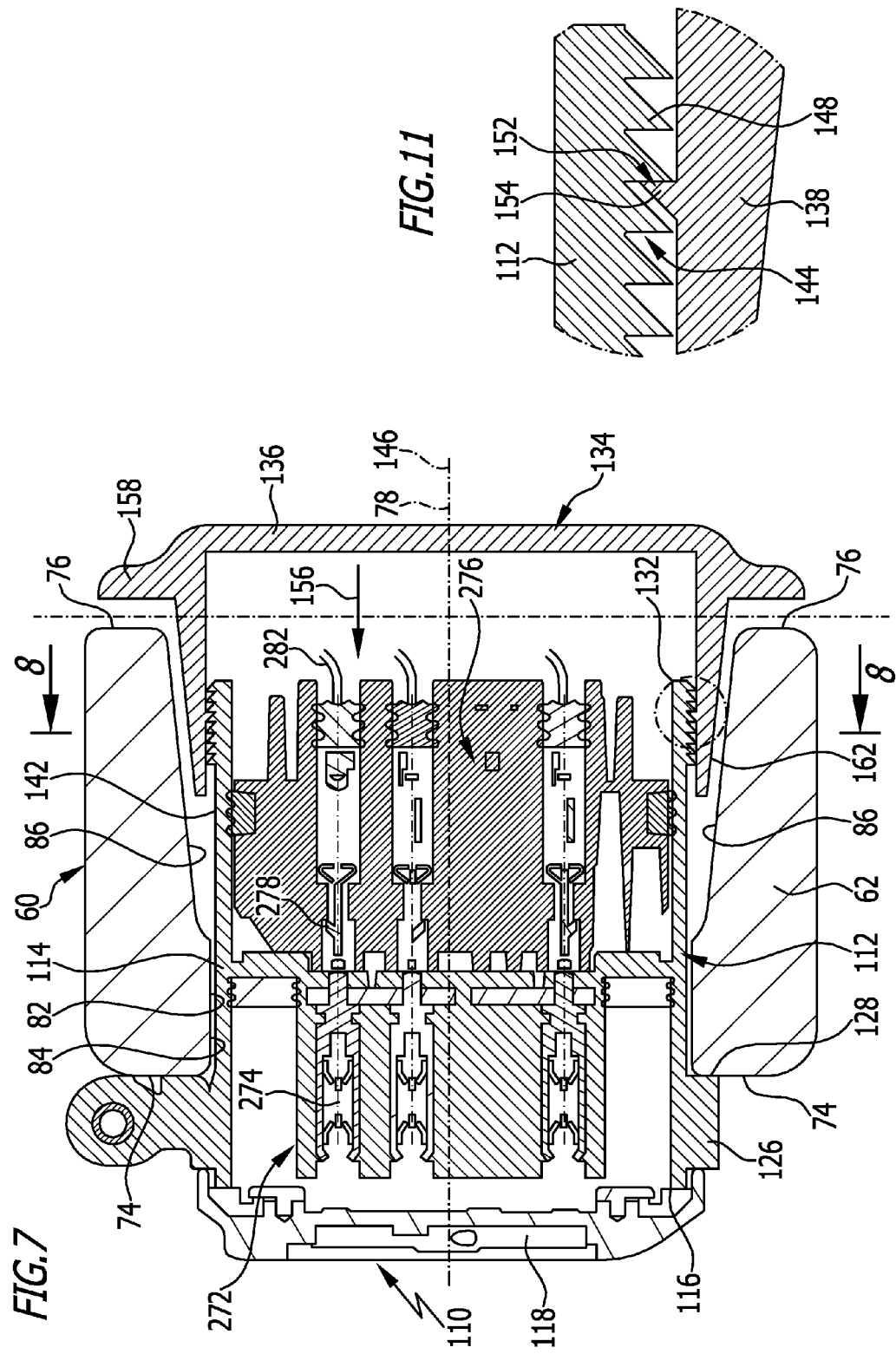
FIG. 7 shows a section along line 7-7 in FIG. 6.
Figure 8:
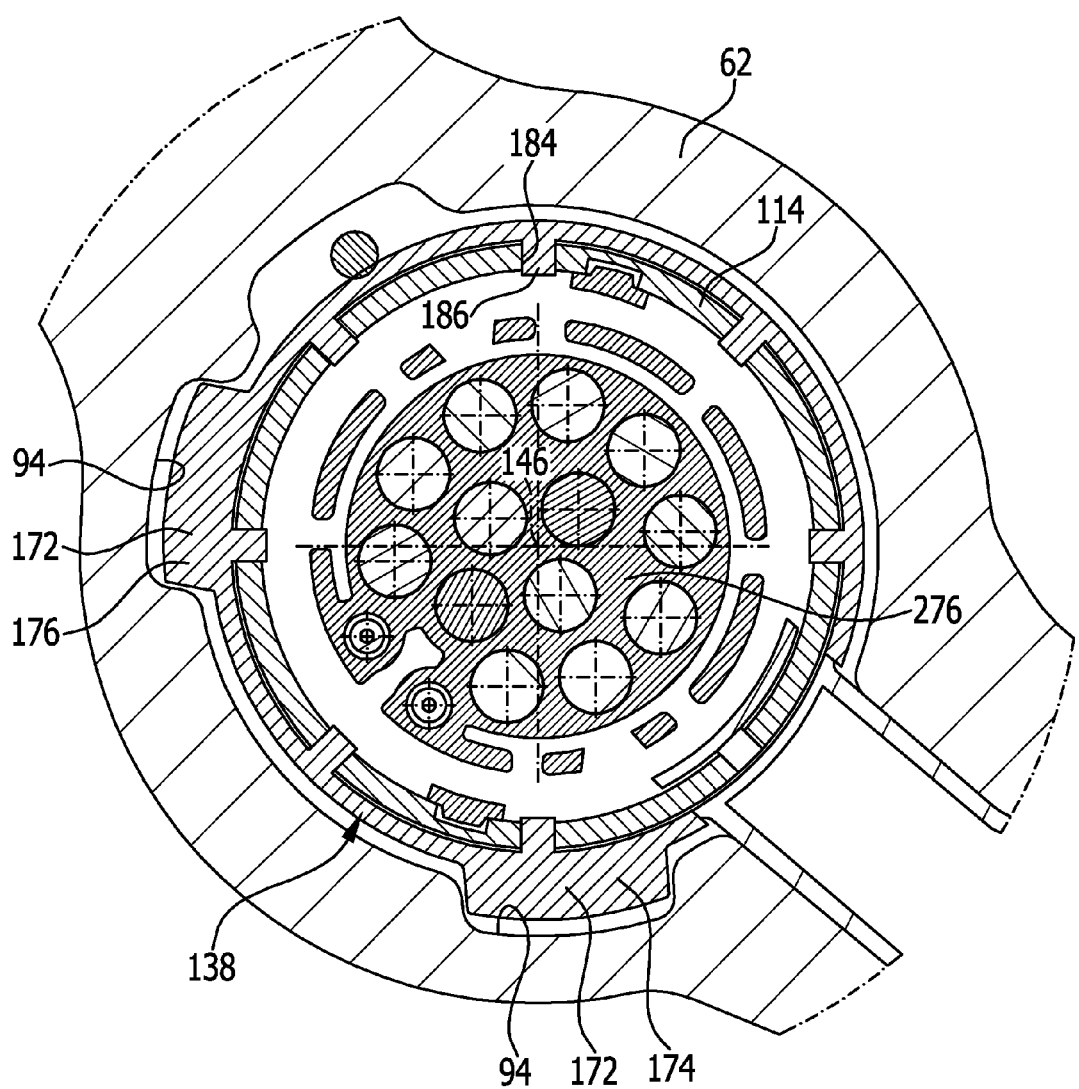
FIG. 8 shows a section along line 8-8 in FIG. 7.
Figure 9:
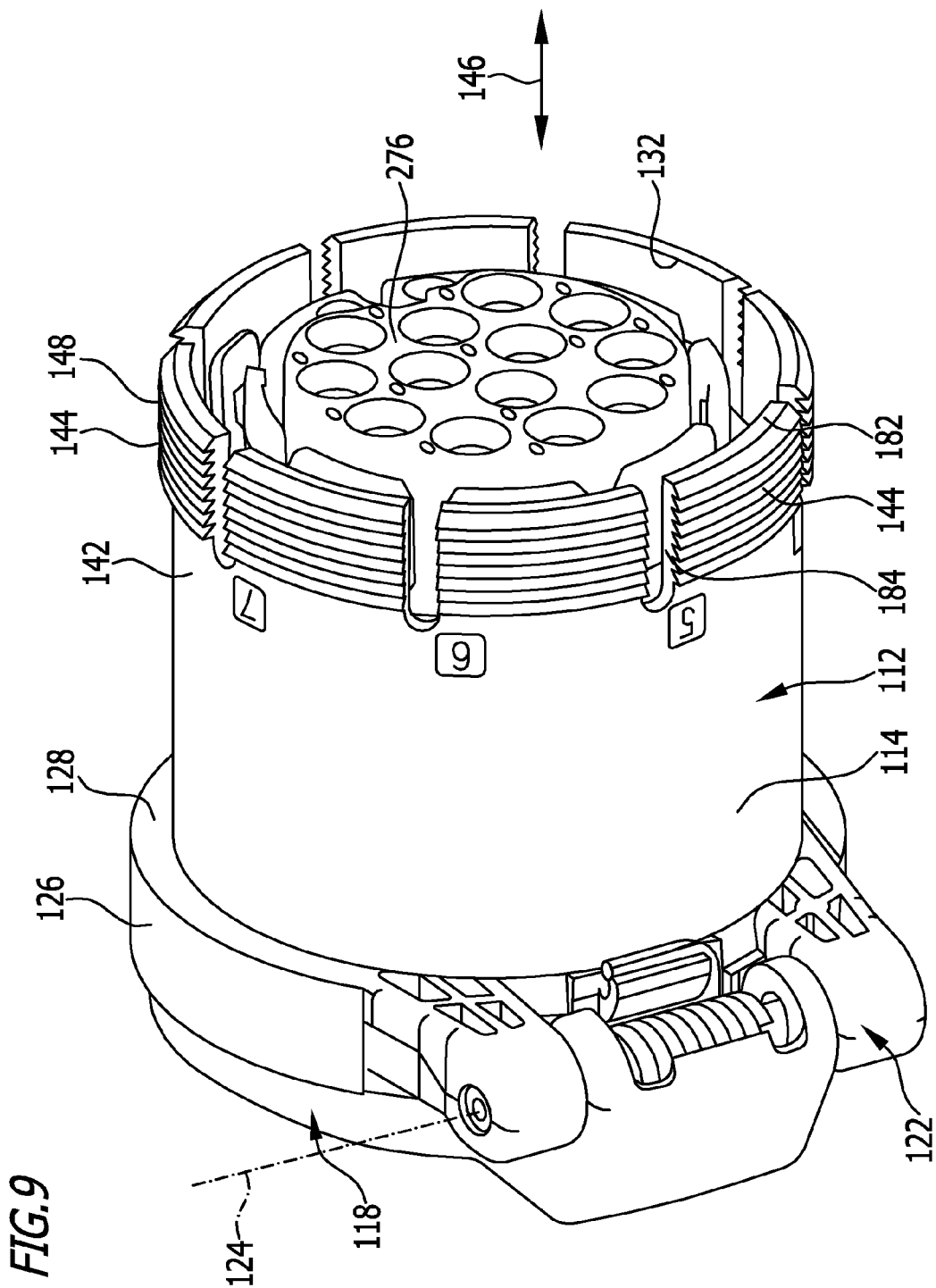
FIG. 9 shows a perspective illustration of the housing sleeve of the socket housing without housing cover.
Figure 10:
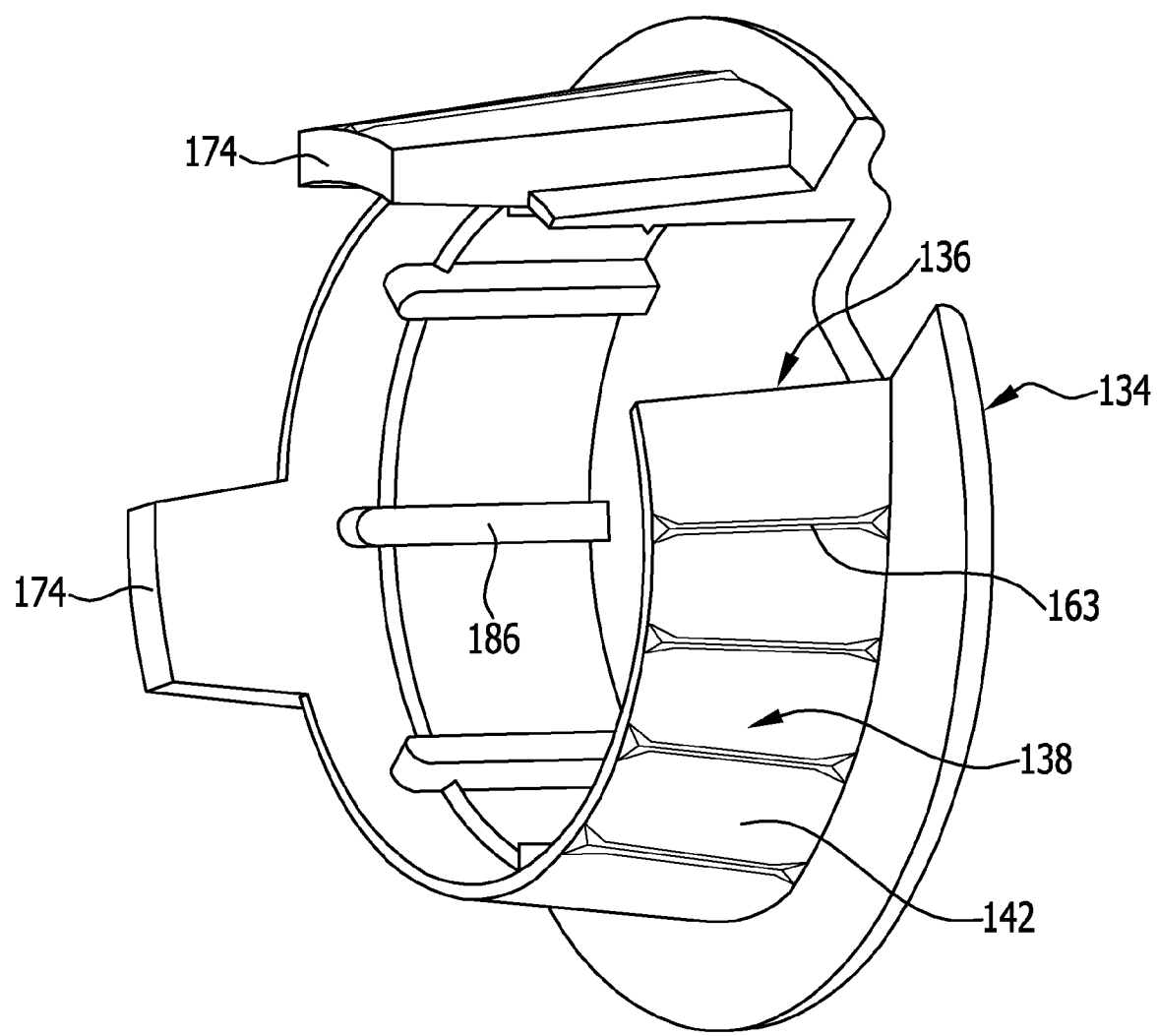
FIG. 10 shows a perspective illustration of the housing cover for the socket according to FIG. 9 in accordance with the first exemplary embodiment of the trailer coupling according to the invention.

In the illustrated exemplary embodiment of the ball neck 40, this has, as illustrated in FIGS. 3 to 5, a housing receptacle 60, which is integrated in one piece in the ball neck 40 and is formed in the manner of an annular body 62, which lies between a ball neck portion 64, which extends from the first end 42 of the ball neck 40 to the annular body 62, and a second ball neck portion 66, which extends from the annular body 62 to the second end of 44 the ball neck.

The annular body 62 of the housing receptacle 60 encloses a receiving channel of the housing receptacle 60, which receiving channel is denoted as a whole by 72 and extends from a first end face 74 of the annular body 62 to a second end face 76 of the annular body 62 and forms a centre axis 78, which runs transversely to the longitudinal centre plane 38, and here may be inclined with respect to the longitudinal centre plane 38 by an acute angle, but preferably runs perpendicularly to the longitudinal centre plane 38.

The receiving channel 72 is formed here by a channel inner wall 82 enclosing said receiving channel, which channel inner wall has, adjacently to the first end face 74, a wall region 84 running substantially cylindrically to the centre axis 78 and running around the centre axis 78 and also has a wall region 86 starting from the wall region 84 and widening conically to the second end face 76, which wall region 86 thus runs, at the transition to the second end face 76, at a larger radial distance from the centre axis 78 than in the vicinity of the cylindrical wall region 84.

In addition, the receiving channel 72 is provided with positively-locking elements 92, which are formed as pockets 94, which widen radially relative to the conical wall region 86, extend starting from the cylindrical wall region 84 in the direction of the second end face 76, and have pocket openings 96 arranged in the end face 76, such that the pockets 94 are accessible via the pocket openings 96 arranged in the second end face 76.

Besides the positively-locking elements 92, a cable guide groove 102 running in the first ball neck portion 64 leads into the conical wall region 86 and has an opening 104 leading into the conical wall region 86 and adjoining the second end face 76.

The cable guide groove 102 is set back both in relation to the second end face 76 and also in relation to a surface 68 of the first ball neck portion 64.

As illustrated in FIGS. 3 and 6 to 10, a socket designated as a whole by 110 is inserted into the socket receptacle 60 and has a socket housing designated as a whole by 112, which engages with the socket receptacle 60.

The socket housing 112 comprises, in turn, a housing sleeve 114, which is provided with an insertion opening 116.

The insertion opening 116 is closable by a cover 118, which is mounted on the housing sleeve 114 by means of a cover hinge designated as a whole by 122 so as to be pivotable about a pivot axis 124.

The cover hinge 122 is formed integrally on a collar 126 adjoining the insertion opening 116, which collar forms a bearing surface 128 which can be placed against the first end face 74 of the socket receptacle 60 and by means of which the socket housing 112 bears against the socket receptacle 60 in the mounted position and is fixed against a movement in the direction of the second end face 76.

The housing sleeve 114 extends from the insertion opening 116 to a rear-side opening 132, which is closable by a housing cover 134.

The housing cover 134 overlaps the rear-side opening 132 with a covering body 136, on which a retaining element 138 is integrally formed, which engages around the housing sleeve 114 on an outer peripheral side 142.

In order to connect the housing cover 134 to the housing sleeve 114, the housing sleeve 114 has, on the outer peripheral side 142 thereof, latching toothings 144 close to the rear-side opening 132, which have a plurality of successive latching teeth 148 in a direction parallel to a centre axis 146 of the socket housing 112.

By way of example, latching toothings 144 arranged opposite one another in pairs are formed identically with regard to the arrangement of the latching teeth 148, the latching teeth 148 of different pairs possibly being arranged offset relative to one another in the direction of the centre axis 146 in order to enable an even more precise positioning of the retaining element 138 relative to the housing sleeve in the direction of the centre axis 146 than is predefined by the distance of the latching teeth 144, specifically in that the latching is established in each case by at least one pair of mutually opposed latching toothings 144, whereas another pair or other pairs do not contribute to the latching in this position.

A counter-toothing 152 formed integrally on the retaining element 138 engages with this latching toothing 148, as illustrated in FIG. 11, and has at least one latching tooth 154, but possibly may also have further latching teeth 154.

The latching toothing 144 and the counter-toothing 152 are preferably formed such that, as the retaining element 138 is slid on in a fitting direction 156, which runs parallel to the centre axis 146, the two toothings 144 and 152 mesh with one another and latch with one another securely, preferably non-detachably.

The housing cover 134 is fitted in the fitting direction 156 until the retaining element 138 bears against the socket receptacle 60, such that the entire socket 110 is thus held on the socket receptacle 60 securely against movements in the direction of the centre axis 78 of the receiving channel 72, since on the one hand the bearing surface 128 bears against the first end face 74 of the socket receptacle 60, and on the other hand the retaining element 138 is supported on the socket receptacle 60.

The retaining element 138 can be supported on the socket receptacle 60 by a supporting flange 158 protruding radially beyond the retaining element 138, which supporting flange can bear against the second end face 76 and secures the retaining element 138 against a movement in the direction of the first end face 74.

This can be implemented alternatively or additionally in that the retaining element 138 is provided with a conically extending outer surface 162, which faces the wall region 86 extending conically in relation to the centre axis 78 and which in particular has the same cone angle as the conically extending wall region 86, such that, by fitting the retaining element 138 on the housing sleeve 114, the housing sleeve 114 is centred on account of the conical outer surface 162 bearing against the conical wall region 86 and is supported against a movement of the retaining element 138 in the direction of the first end face 74.

Here, the outer surface 162 can also be provided with outwardly protruding scraper fins 163, which ensure a further improved fit and contribute to the tolerance compensation.

In addition, the housing sleeve 114 is also centred radially by the cylindrical wall region 84 of the channel inner wall 82 in the region in a region adjoining the collar 126, such that the socket housing 112 is thus securely fixed in the socket receptacle 60.

The fact that, for example, the latching toothing 144 has a plurality of latching teeth 148 and the counter-toothing 152 is thus latchable with the latching toothing 144 in a plurality of latching positions corresponding to the plurality of latching teeth 148 makes it possible, when fitting the retaining element 138 to the housing cover 134 and sliding it in the fitting direction 156, to compensate for dimensional tolerances in the region of the annular body 62, which are created during production of the annular body 62 as a forged part.

The socket 110 can thus be mounted in the socket receptacle 60 in a simple and reliable manner, and also in a manner insensitive to dimensional tolerances.

In order to secure the socket 110 in a manner fixed against rotation, the retaining element 138 is provided with positively-locking elements 172 in the form of wedge bodies 174, which is introducible into the pockets 94 as the retaining element 138 is fitted in the fitting direction 156 over the pocket openings 96, such that the retaining element 138 is fixed in the ring body 62 in a manner fixed against rotation by the positively-locking elements 172 cooperating with the positively-locking elements 92.

The positioning by the wedge bodies 174 by way of example can be made even less sensitive to tolerance in that the wedge bodies 174 are provided with outwardly protruding scraper fins 175.

Merely an additional rotationally fixed fixing of the housing sleeve 114 relative to the retaining element 138 is thus also necessary.

This is achieved in that the housing sleeve 114 is provided in an end portion 182 carrying the latching toothings 144 with slits 184 extending parallel to the centre axis 146, which slits are engaged by webs 186 formed integrally on the retaining element 138 and protruding radially in the direction of the centre axis 146.

The slits 184 are preferably arranged around the centre axis 146 at equal angular distances, and the corresponding webs 186 are also arranged at equal angular distances, such that it is possible to fix the housing sleeve 114 with a positive engagement and in a manner fixed against rotation relative to the retaining element 138 in various rotary positions, and to thus predefine different rotary positions of the housing sleeve 114 relative to the retaining element 138.

In a second exemplary embodiment of a trailer coupling according to the invention, those parts that are identical to those of the first exemplary embodiment are provided with the same reference signs, and therefore reference can be made fully to the comments relating to the first exemplary embodiment with regard to the description of these parts.

In the second exemplary embodiment a sensor system 202 is associated for example with the second ball neck portion 66 and/or the coupling ball 46, a sensor connection line 204 being guided to said sensor system and running through a channel 206, which passes through the ball neck portion 66, the ball attachment 48 and possibly the coupling ball 46, and which likewise leads into the receiving channel 72 of the socket receptacle 60, such that the sensor connection line 204 is to be continued within the receiving channel 72.

A sensor system 202 of this type is, for example, an angle of inclination sensor for measuring an angle of inclination between the ball neck 40 and a towing ball coupling provided on a trailer drawbar and/or a sensor system for measuring forces acting on the coupling ball 46 and/or the ball neck 40.

Figure 12:
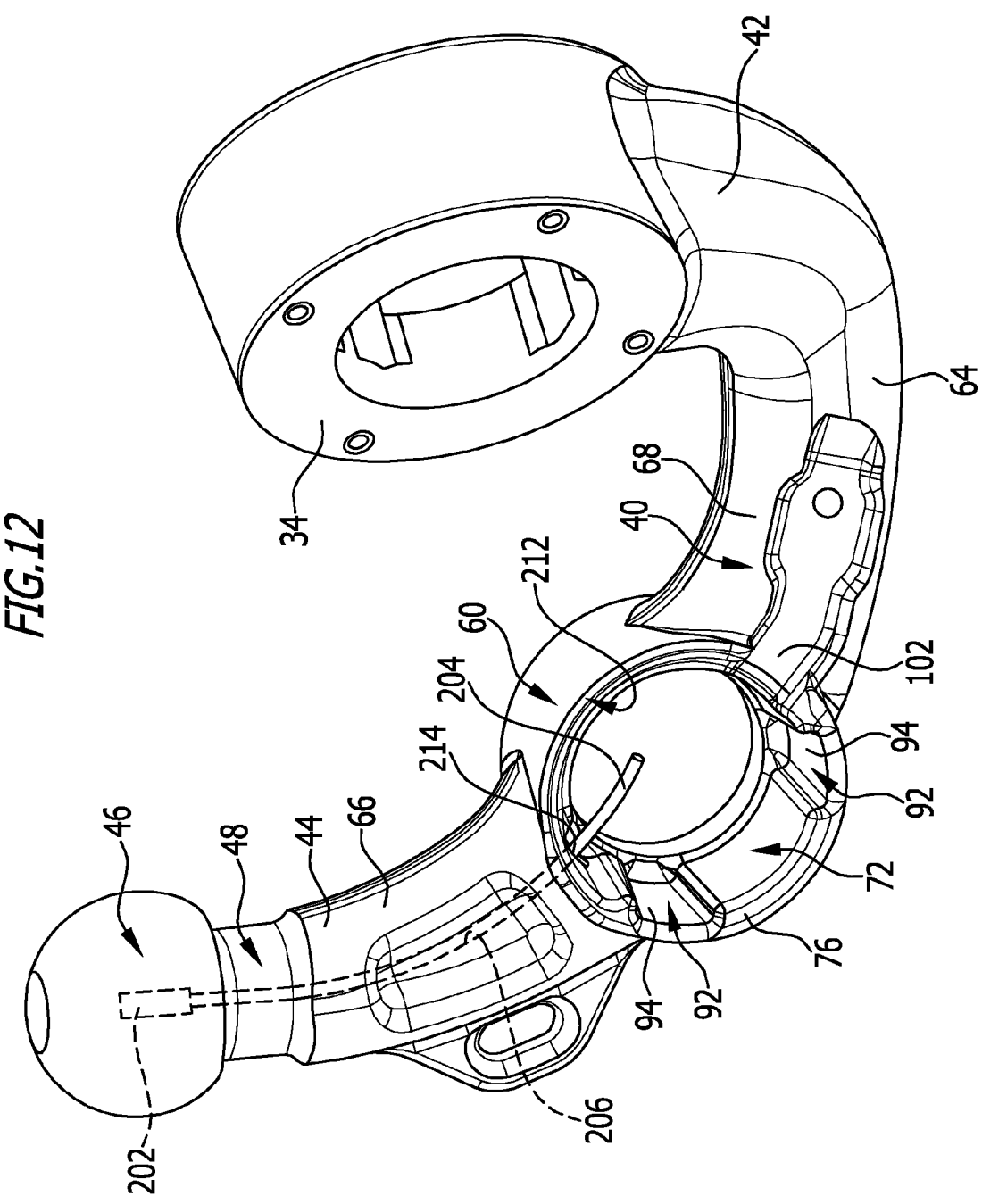
FIG. 12 shows an illustration similarly to FIG. 4 in a second exemplary embodiment of the trailer coupling according to the invention.
Figure 13:
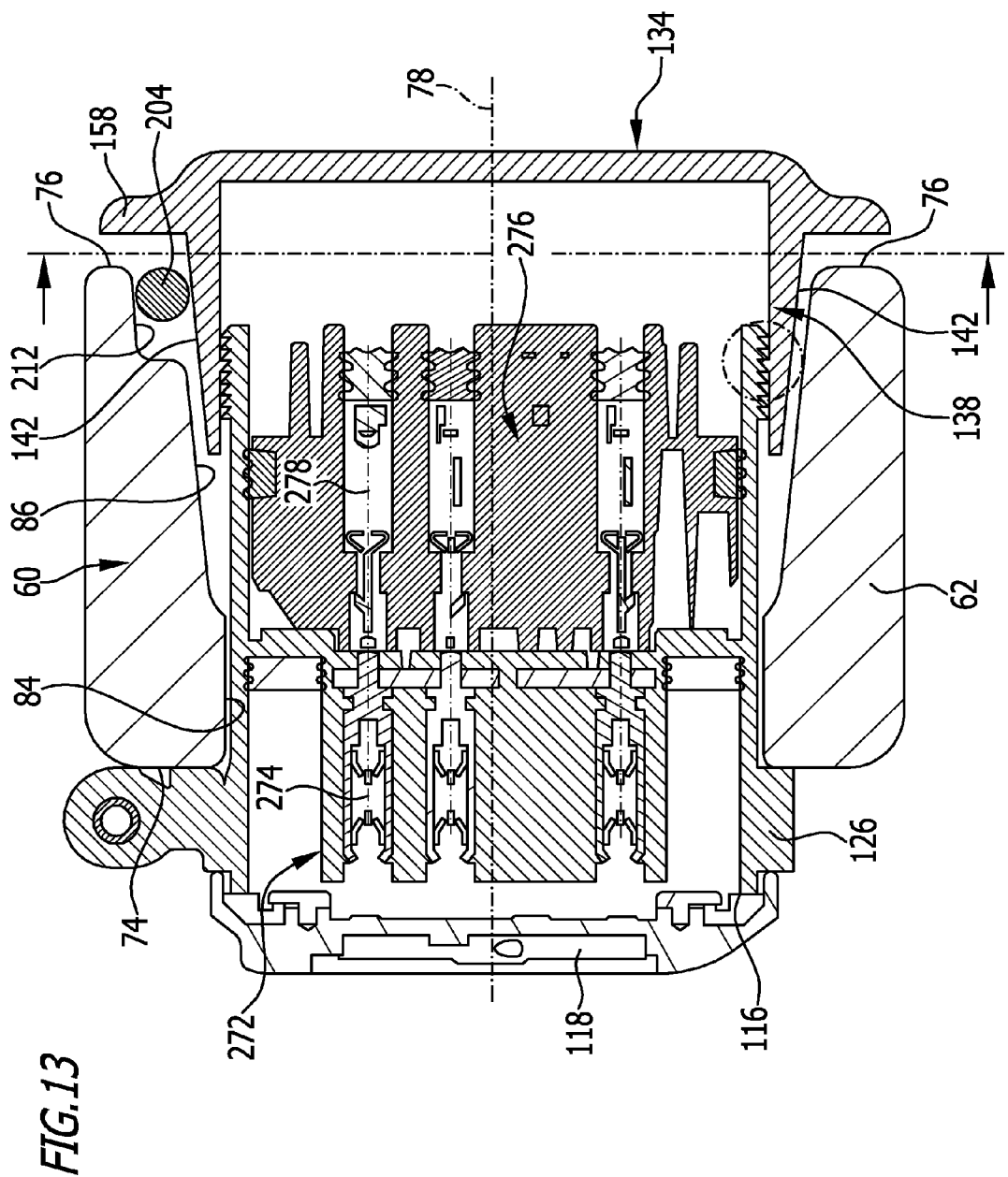
FIG. 13 shows a section similarly to FIG. 7 in the second exemplary embodiment of the trailer coupling according to the invention.

For this purpose, as illustrated in FIGS. 12 and 13, a stepped recess 212 is provided in the wall region 86, specifically directly adjacent to the second end face 76, and runs from a mouth region 214 of the channel 206 in the receiving channel 72, said mouth region being arranged in a manner recessed relative to the channel inner wall 82, to the cable guide groove 102, more specifically in particular runs on a side of the conical wall region 86 facing away from the positively-locking elements 92.

In the simplest case it is possible, as illustrated in FIG. 13, to allow the sensor connection line 204 to run between the outer surface 162 of the retaining element 138 and the stepped indentation 212 from the mouth region 214 to the cable guide groove 102, and then to combine this in the cable guide groove 102 with a socket supply line 106 to form a cable harness 108, or to allow this to continue in this cable harness to a connection unit on the motor vehicle.

Figure 14:
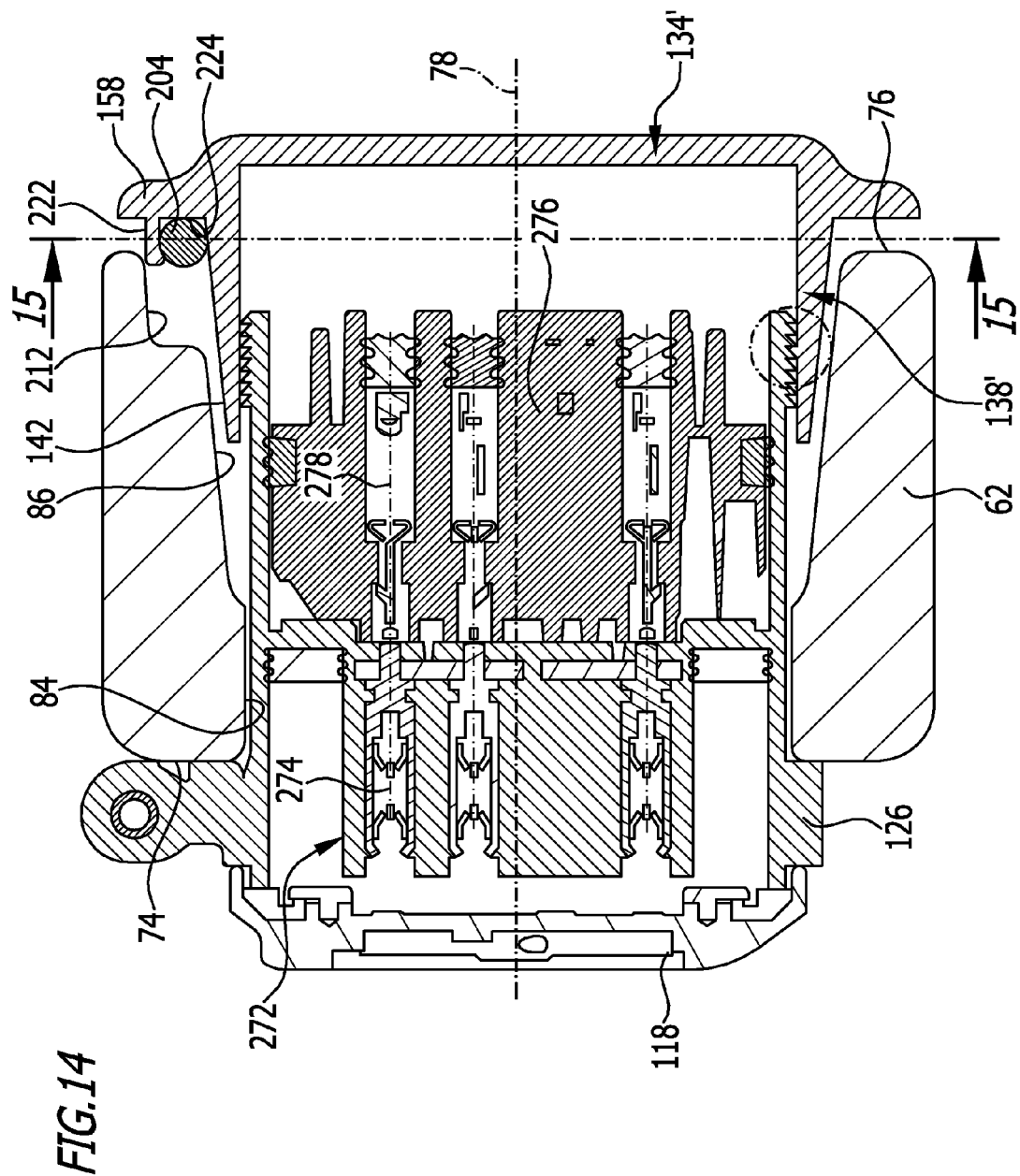
FIG. 14 shows a section similarly to FIG. 13 in a third exemplary embodiment of a trailer coupling according to the invention.
Figure 15:
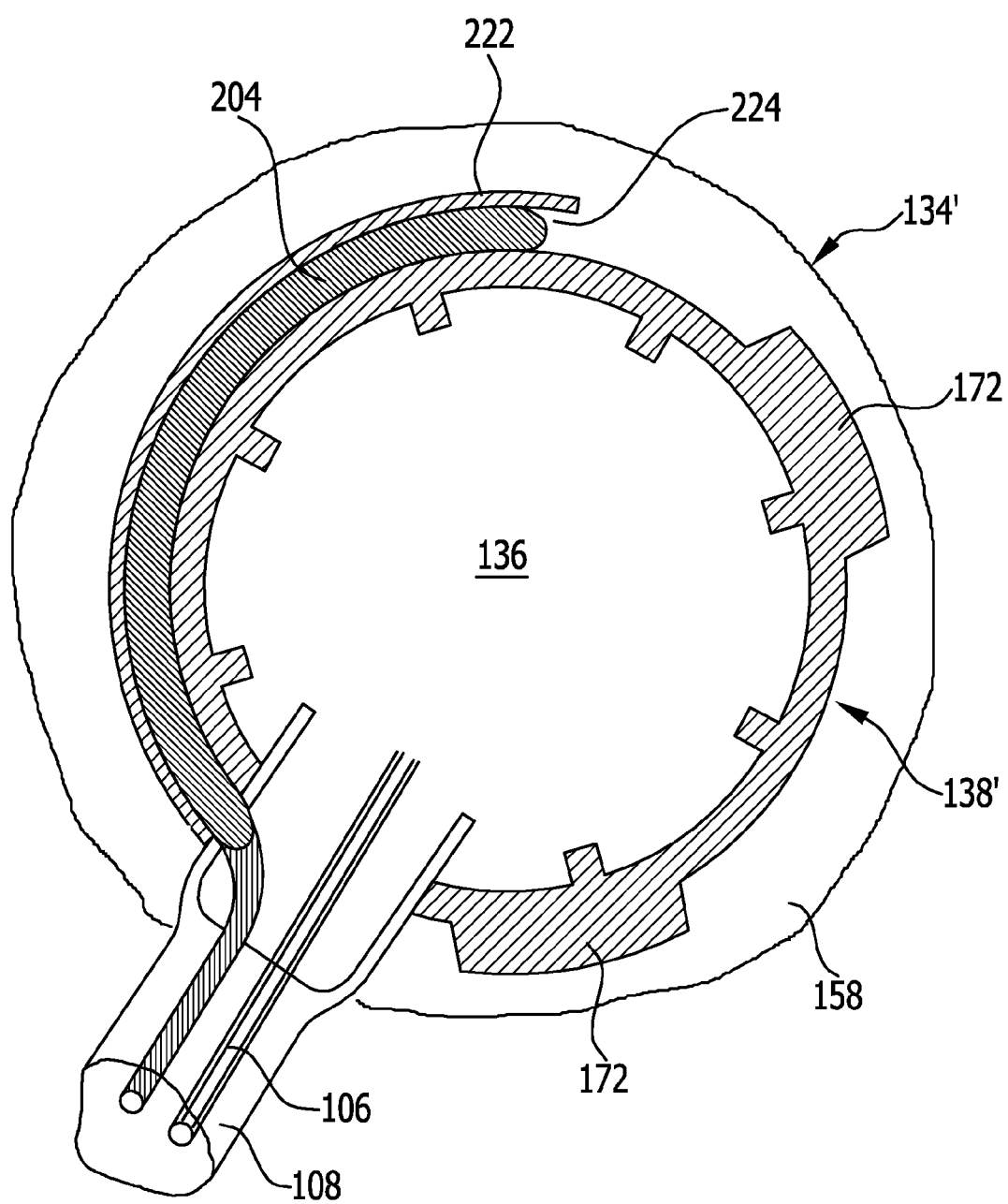
FIG. 15 shows a section along line 15-15 in FIG. 14 through the housing cover of the third exemplary embodiment of the trailer coupling according to the invention.

In a third exemplary embodiment of the trailer coupling according to the invention, illustrated in FIGS. 14 and 15, the sensor connection 204, for protection thereof, is guided on the retaining element 138' in such a way that a supporting web 222 running parallel to the outer surface 162 of the retaining element 138 is arranged on the supporting flange 158 in the region of the supporting flange 158 facing towards the stepped indentation 212 and runs at a distance from the outer surface 162 of the retaining element 138', such that a U-shaped channel 224 is created between the supporting web 222 and the retaining element 138', in which channel the sensor connection line 204 is laid and by which the connection line 204 is guided, such that this can run in the retaining element 138', in a manner protected against mechanical influences, guided from the mouth region 214 to the cable guide groove 102.

In addition, in this third exemplary embodiment of the trailer coupling according to the invention, all those elements identical to those of the first exemplary embodiment are also provided with the same reference signs, and therefore reference can be made fully to the comments relating to the first exemplary embodiment with regard to the description of these parts.

Figure 16:
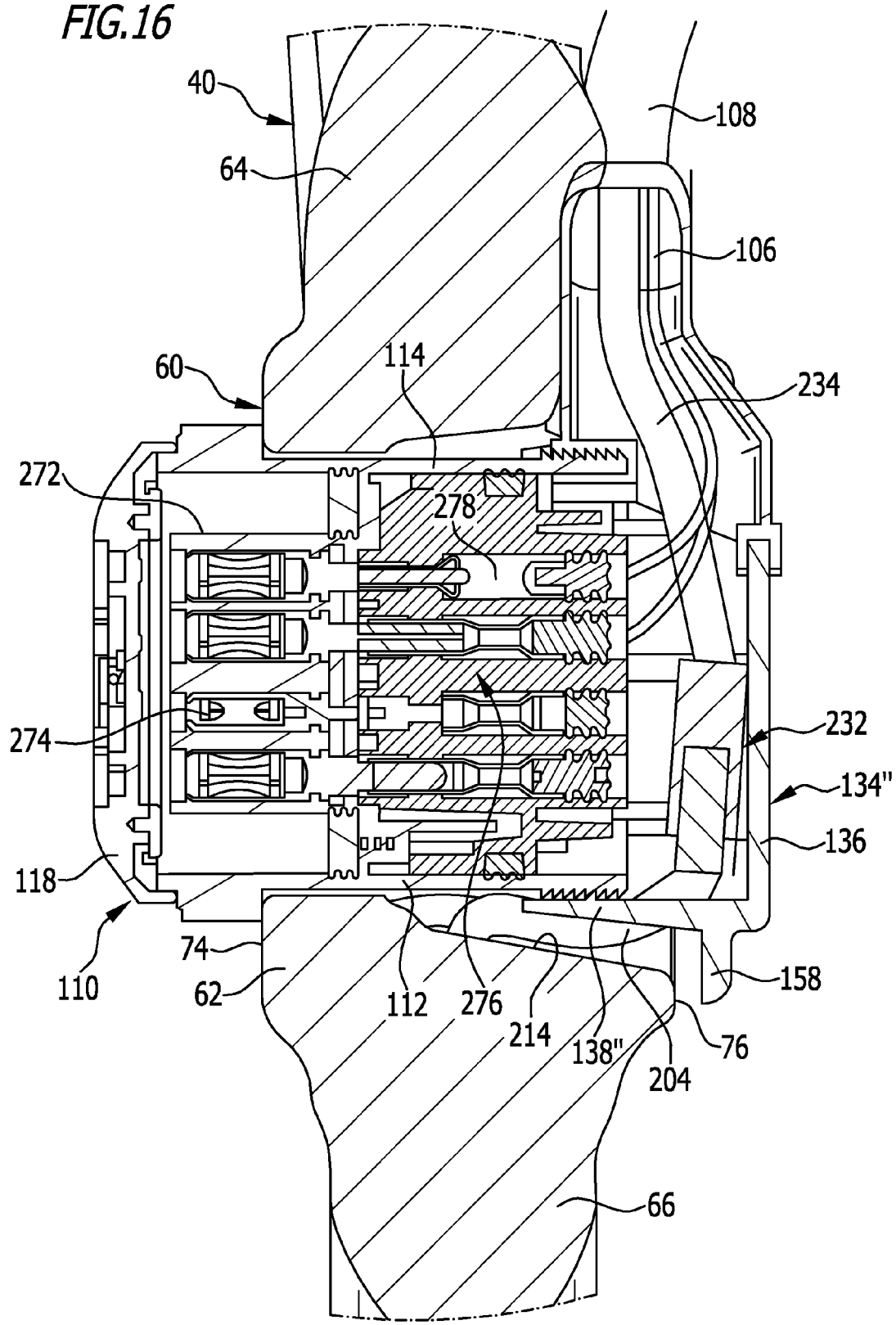
FIG. 16 shows a section similarly to FIG. 7 through a fourth exemplary embodiment of the trailer coupling according to the invention.

In a fourth exemplary embodiment, illustrated in FIG. 16, the connection line 204 coming from the sensor system 202 is introduced into the housing cover 134" from the mouth region 214 through the retaining element 138" and is connected by means of a plug connection 232, which is fixed to the housing cover 134", preferably to the covering body 136 of the housing cover 134", to a sensor line 234 also guided in the cable harness 108 with the socket supply line 106, such that the cable harness 108 comprising the socket supply line 106 can be equipped in advance with the sensor line 234, which can then be connected within the housing cover 134" via the plug connection 232 to the sensor connection line 204 coming from the sensor system 202.

In addition, in the fourth exemplary embodiment, all those elements identical to those of the above exemplary embodiments are provided with the same reference signs, and therefore reference can be made fully to the comments relating to these exemplary embodiments.

Figure 17:
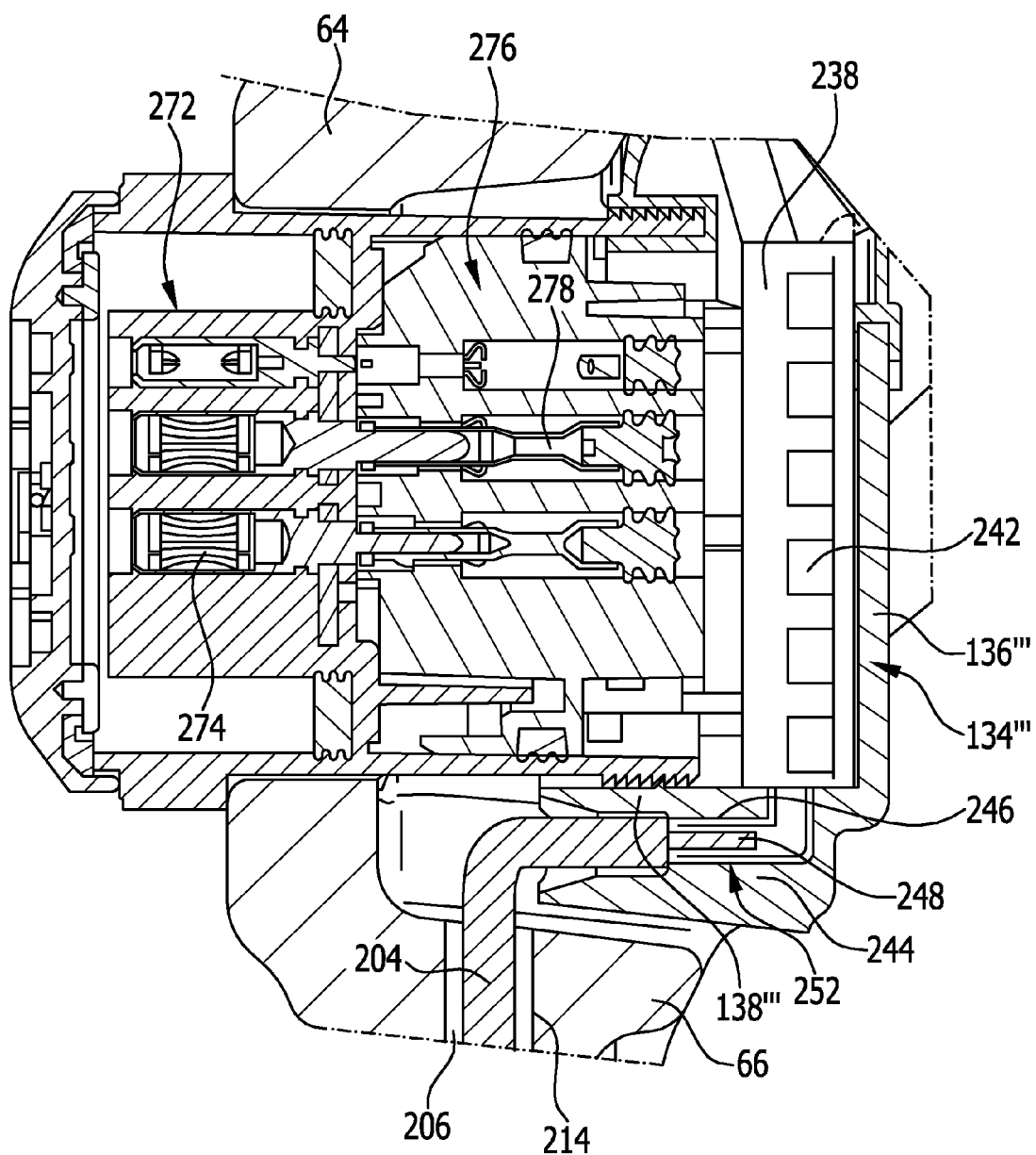
FIG. 17 shows a section similarly to FIG. 7 through a fifth exemplary embodiment of the trailer coupling according to the invention.

In a fifth exemplary embodiment of a trailer coupling according to the invention, illustrated in FIG. 17, those parts identical to those of the above exemplary embodiments are provided with the same reference signs, and therefore reference can be made fully to the comments relating to the above exemplary embodiments, in particular the first exemplary embodiment, with regard to the description of these parts.

In contrast to the above exemplary embodiments, in this exemplary embodiment the housing cover 134''' is formed such that it is also provided with an electronic circuit 242 associated with the sensor system 202, for example an evaluation circuit for the sensor system 202, the circuit 242 preferably being arranged and held on an inner side of the covering body 136''' in a receiving space 238 of the housing cover 134'''.

In this exemplary embodiment a socket housing 244 is also formed integrally on the retaining element 138''', in which socket housing plug contact units 246 are arranged, into which contact pins 248 of the sensor connection line 204 are pluggable, such that a connection between the sensor connection line 204 and the circuit 242 is producible via a plug connection 252, of which the socket housing 244 and the plug contact units 246 are integrated in the housing cover 234′′′′.

In addition, in the fifth exemplary embodiment, all those elements identical to those of the above exemplary embodiments are provided with the same reference signs, and therefore reference can be made fully to the comments relating to these exemplary embodiments.

Figure 18:
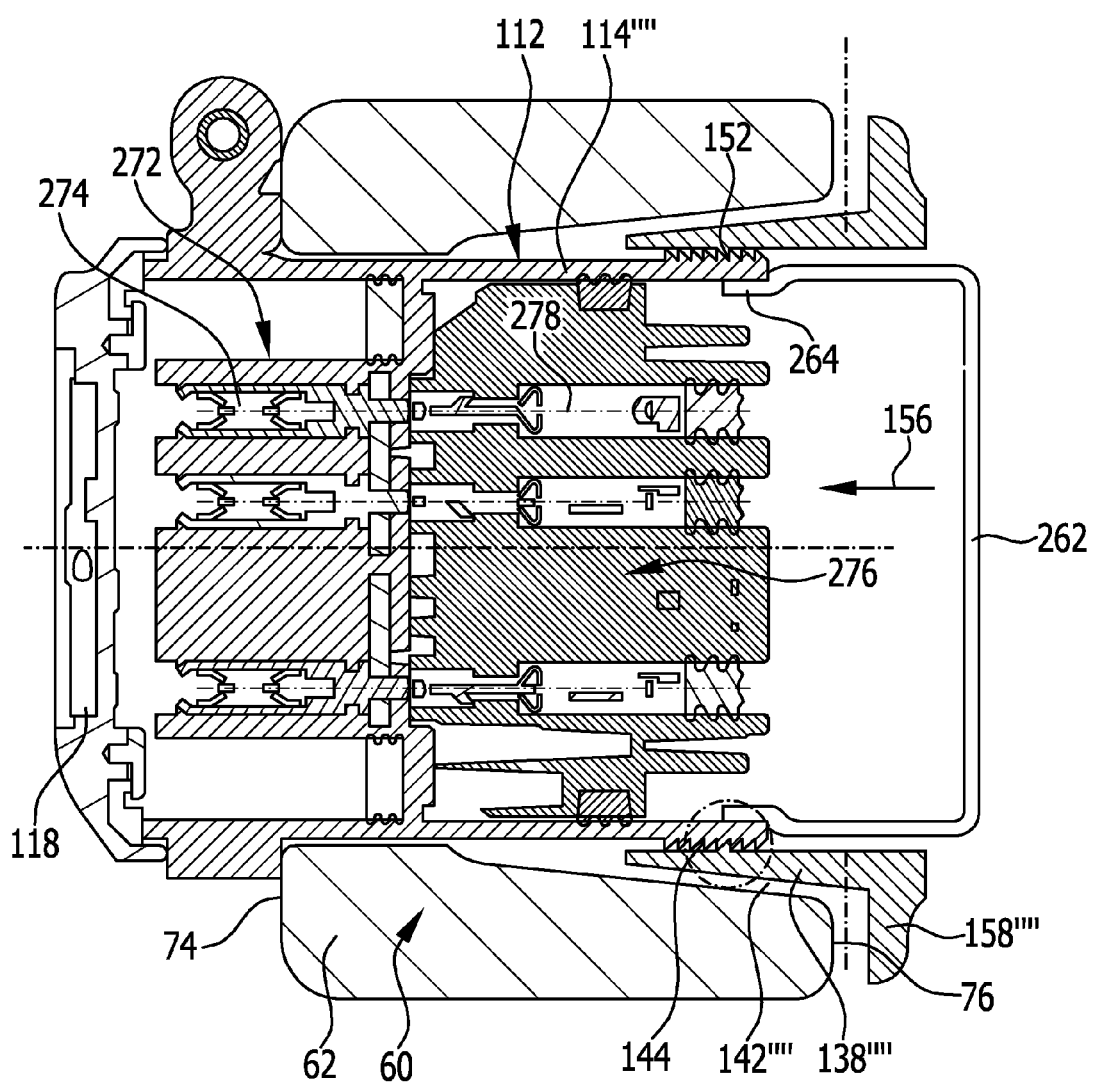
FIG. 18 shows a section similarly to FIG. 7 through a sixth exemplary embodiment of the trailer coupling according to the invention.

In a sixth exemplary embodiment of a trailer coupling according to the invention, illustrated in FIG. 18, in contrast to the above exemplary embodiments, the housing sleeve 114′′′′ is provided itself with a cover 262, the cover 262 engaging for example via a retaining region 264 with the housing sleeve 114′′′′ and is thus connected to the housing sleeve 114′′′′ either with positive engagement or by other fastening possibilities, such as adhesive bonding.

However, the housing sleeve is still fixed by the retaining element 138′′′′, which also still has the supporting flange 158′′′′, which is supported on the second end face 76 of the ring body 62. Here, the housing sleeve 114′′′′ is fixed by the retaining element 138′′′′ in the same manner as described in conjunction with the above exemplary embodiments.

In addition, in the sixth exemplary embodiment, all those elements identical to the above exemplary embodiments are provided with the same reference signs, and therefore reference can be made fully to the comments relating to the above exemplary embodiments.

Figure 19:
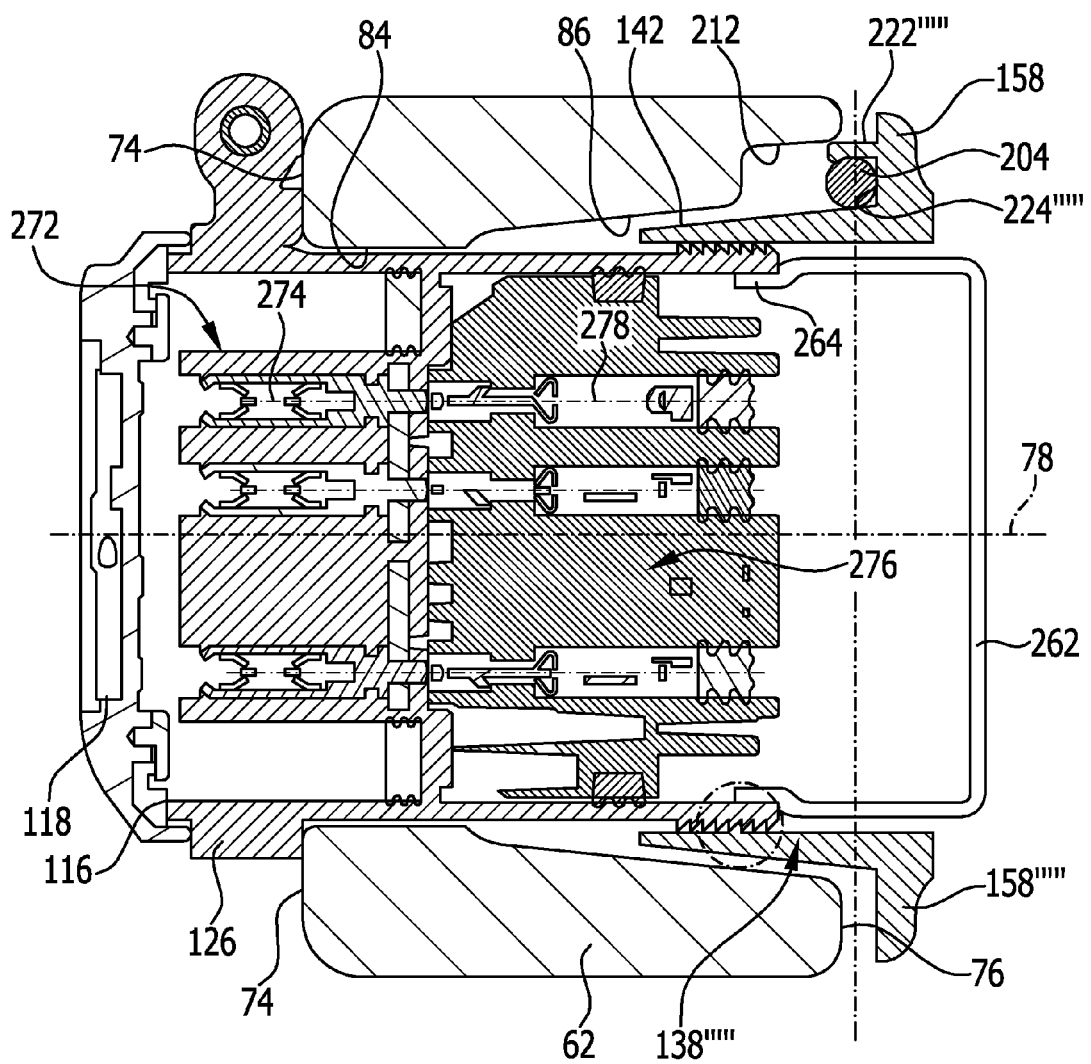
FIG. 19 shows a section similarly to FIG. 7 through a seventh exemplary embodiment of the trailer coupling according to the invention.

In a seventh exemplary embodiment, illustrated in FIG. 19, the retaining element 138′′′′′, similarly to the third exemplary embodiment illustrated in FIGS. 14 and 15, is provided with the supporting web 222′′′′′, such that the channel 224′′′′′ is formed, in which the sensor connection line 204 can be guided by the retaining element 138′′′′′ from the mouth region 214 to the cable guide groove 102.

In addition, in the seventh exemplary embodiment, all those elements identical to the above exemplary embodiments are provided with the same reference signs, and therefore reference can be made fully to the comments relating to these exemplary embodiments.

In all exemplary embodiments a contact carrier 272 is provided in the socket 110 within the socket housing 112, in which contact carrier plug contacts 274 are provided, which can be connected to a plug that is pluggable into the socket 110.

The plug contacts 274 are contacted in turn by a contact plug designated as a whole by 276, which in turn has contact elements 278, which are connected on the one hand to the plug contacts 274 in the plugged-in state of the contact plug 276 and on the other hand are connected to individual cores 282 of the socket supply line 106.

The invention claimed is:

1. Trailer coupling comprising a ball neck supporting a coupling ball, and also comprising a socket receptacle arranged on the ball neck for a socket for the power supply of units acting on the coupling ball, the socket having a socket housing with a housing sleeve, which is provided with an insertion opening, and the insertion opening being closable by a cover that is mounted pivotably on the housing sleeve, the socket receptacle has a receiving channel, into which the housing sleeve extends starting from a first side of the socket receptacle, in that the housing sleeve bears against the first side of the socket receptacle via a bearing surface, and in that the housing sleeve is fixed to the socket receptacle by a retaining element, which is fitted starting from a second side of the socket receptacle and which is supported on the socket receptacle and is connected to the housing sleeve by a latched connection, the retaining element has a portion extending on an outer peripheral side of said housing sleeve and is supported by said portion in the receiving channel.

2. Trailer coupling according to claim 1, wherein the retaining element is supported by said portion on a conically widening wall region of the receiving channel.

3. Trailer coupling according to claim 1, wherein the retaining element is supported via a supporting flange on a second side of the socket receptacle opposite the first side.

4. Trailer coupling according to claim 1, wherein the retaining element is secured on the socket receptacle in a manner fixed against rotation by positively-locking elements.

5. Trailer coupling according to claim 4, wherein the retaining element has a positively-locking element, which enters into a rotationally fixed positively-locking connection with a positively-locking element of the socket receptacle.

6. Trailer coupling according to claim 4, wherein the socket receptacle, as positively-locking element, has a pocket extending from the second side of the socket receptacle into the receiving channel.

7. Trailer coupling according to claim 6, wherein the retaining element has a body engaging with the pocket.

8. Trailer coupling according to claim 5, wherein the positively-locking elements extend parallel to a fitting direction of the retaining element.

9. Trailer coupling according to claim 4, wherein the retaining element and the housing sleeve are connectable to one another in a manner fixed against rotation relative to one another in at least one rotary position.

10. Trailer coupling according to claim 9, wherein the retaining element and the housing sleeve are connected in a manner fixed against rotation by positively-locking elements.

11. Trailer coupling according to claim 10, wherein at least one of the positively-locking elements is arranged on the housing sleeve and/or the retaining element in a number of angular positions about the centre axis, the other positively-locking element engaging with the first-mentioned positively-locking element.

12. Trailer coupling according to claim 1, wherein the latched connection is effective in a position-independent manner within a latching region extending in the fitting direction.

13. Trailer coupling according to claim 1, wherein the retaining element is latchable to the housing sleeve in that either the housing sleeve or the retaining element has a latching toothing with a series of latching teeth extending parallel to the fitting direction and the retaining element or the housing sleeve has a counter-toothing with at least one latching tooth meshing with the series of latching teeth.

14. Trailer coupling according to claim 1, wherein the retaining element is formed as part of a housing cover for closing the housing sleeve on a side opposite the insertion opening.

15. Trailer coupling comprising a ball neck supporting a coupling ball, and also comprising a socket receptacle arranged on the ball neck for a socket for the power supply of units acting on the coupling ball, the socket having a socket housing with a housing sleeve, which is provided with an insertion opening, and the insertion opening being closable by a cover that is mounted pivotably on the housing sleeve, the socket receptacle has a receiving channel, into which the housing sleeve extends and the receiving channel has an indentation for receiving a sensor connection line, the sensor connection line is guided along an outer surface of a retaining element.

16. Trailer coupling according to claim 15, wherein the retaining element has a guide for the sensor connection line.

17. Trailer coupling according to claim 15, wherein the sensor connection line is guided in the housing cover.

18. Trailer coupling according to claim 15, wherein a plug connection for the sensor connection line is arranged in the housing cover.

19. Trailer coupling according to claim 18, wherein a plug connection of a plug contact unit for the sensor connection line is integrated in the housing cover.

20. Trailer coupling according to claim 15, wherein a receiving space for an electronic circuit is provided in the housing cover.

21. Trailer coupling according to claim 20, wherein the housing cover has a receiving space for an electronic circuit connected to the sensor connection line.

22. Trailer coupling according to claim 15, wherein the sensor connection line is guided to a sensor system associated with the ball neck.

\* \* \* \* \*